Oct. 17, 1933.　　　　W. THOMAS　　　　1,931,274
CONSTANT READING DEPTH INDICATOR AND FLOW VALVE THEREFOR
Filed Dec. 18, 1928
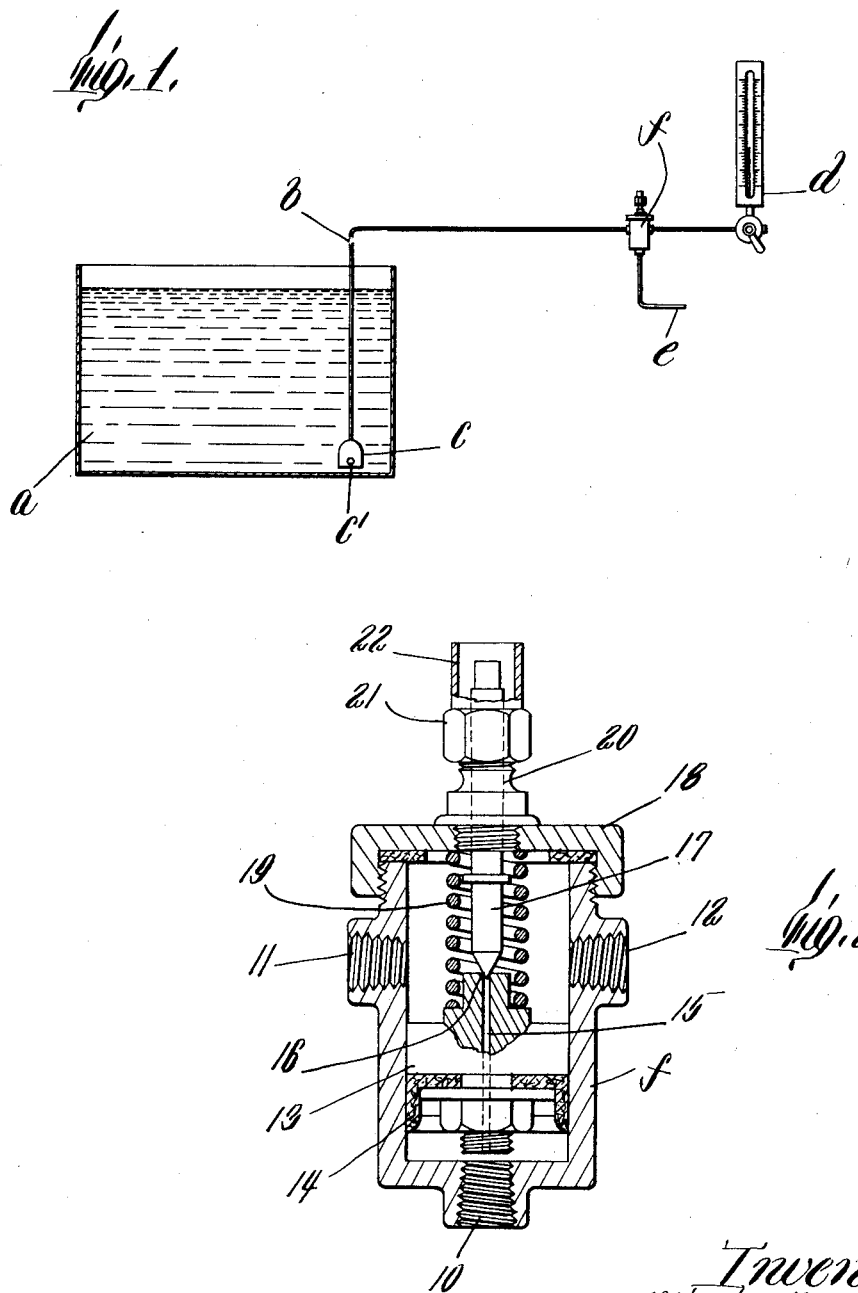
Inventor
William Thomas Patented Oct. 17, 1933

1,931,274

UNITED STATES PATENT OFFICE 1,931,274

CONSTANT READING DEPTH INDICATOR AND FLOW VALVE THEREFOR

William Thomas, Bogota, N. J., assignor to Pneumercator Company, Brooklyn, N. Y., a corporation of Maine Application December 18, 1928
Serial No. 326,754

4 Claims. (Cl. 73—54)

This invention relates to apparatus for measuring the depth or head of liquid in tanks and elsewhere, or values dependent on such depth, at a distance from the point of measurement, through the agency of air confined at a pressure equal to the head of the liquid at such point, which exerts its pressure on a column manometer or other suitable pressure gauge. In other words, it relates to apparatus of the type shown in the patent to Harry S. Parks, No. 1,131,412, dated March 9, 1915, for Pneumatic depth indicator. Its object is to enable apparatus of this character to be used for constant reading, in order to show variations in the liquid head as soon as such variations occur, and to do so with an accuracy equal to that obtainable when periodic readings are taken in accordance with the instructions given in said Parks patent.

In the use of this type of measuring instrument, it is necessary that the pipe line, which leads from the submerged point of measurement in the liquid to the indicator or gauge and contains air at a pressure equal to the pressure head of the liquid at the point of measurement, should be entirely clear of liquid from the gauge to the submerged orifice which establishes the reference point where the measurement is taken, in order that the pneumatic pressure may be a true measure of the liquid head at the level of this point. Hence, when taking periodic readings, as per the said Parks patent, the operator blows out the line by admitting enough air to it at a pressure enough greater than the liquid head to cause outflow of air from the submerged orifice (thus ensuring complete expulsion and exclusion of the liquid), and then shutting off the air supply, before reading the gauge; but with the new instrument organized according to the present invention for continuous indication, a constant slight flow or trickle of air is caused to pass through the line under pressure great enough to expel the liquid under all heads.

It is essential of course that the pressure available for blowing air through the line be great enough to equal at least, and preferably somewhat to exceed, the highest liquid head within the range of measurement for which the apparatus is adapted. And in cases where the apparatus is applied to closed tanks containing liquid under pneumatic pressure, the air supply pressure must equally exceed the sum of the liquid head and the tank pressure head, however great the sum of these heads may be. Although the effect of the pneumatic tank pressure on the indicating column may be cancelled by a pipe line leading from the air space of the tank to the head of the indicating column, as explained in the said Parks patent, this does not avoid the necessity of maintaining a pressure of the magnitude above indicated in the supply of air provided for expelling and excluding liquid from the line. In situations where an apparatus of this character may be used, as in measuring the depth of water impounded by a high dam, taking soundings in deep water over an irregular bottom, etc., the actual head may vary within extremely wide limits; while with tanks holding liquid under pneumatic pressure, such pressure may vary within wide limits independently of variations in the actual height of the liquid.

In view of these conditions, the provision of automatic means for maintaining a just balance between the pressure under which air is forced through the pipe line and the back pressure imposed by the liquid head, or the sum of the liquid head and a pneumatic superpressure, has been a difficult problem. In order to make a constantly readable instrument, one which does not require a manipulation before each reading is taken, there must be a constant trickle of air through the line sufficient in pressure and amount to exclude all liquid down to the submerged orifice which establishes the reference level of measurement. But it is also important that the quantity and pressure of the air thus admitted to the line be not much in excess of the back pressure, for if it is, it will cause the gauge to err by showing a value greater than the true head. This error is due to the fact that the friction of air forced through the pipe line in quantities and at a pressure much in excess of that necessary to overcome the back pressure creates a false head which is added to the value indicated by the gauge. This error is particularly pronounced in the case of long pipe lines, where the indicator gauge is far distant from the body of liquid being measured, and also in lines having numerous bends and angles.

Now defining my object and problem more exactly in view of the foregoing explanation, it is to provide means, in connection with pneumatic depth measuring equipment, for automatically regulating the constant flow of air to the pipe line or air tube in direct proportion to the back pressure applied by and through the liquid. This problem has been solved and the object accomplished by the provision and application in combination with such pneumatic depth measuring apparatus of an automatic throttle valve under control of the opposing pressures of the air supply and the back pressure in the pipe line for so regulating the air inflow to the line. The invention consists in the combined apparatus including such a valve and also in the novel principles and details of an automatic throttle valve arranged to permit passage of more or less air according as the back pressure is higher or lower, respectively.

In the accompanying drawing, I have shown the application of this invention to the use of measuring the depth of liquid in a tank, together with the preferred form of my novel automatic flow controlling valve.

Fig. 1 is a diagram of the measuring instrument and tank; and

Fig. 2 is a sectional detail view of the valve.

Referring to Fig. 1, a represents a tank of any character containing any liquid, which may be under atmospheric pressure or any other pressure greater or less than the atmosphere. Specifically, it may be considered to be an oil tank, while generically it typifies any body of liquid, whether an enclosed body or an open body, as a lake or the sea, in which it is desired for any purpose to measure the distance between its surface and a submerged point. b represents an air pipe line or tube connected to a submerged balance chamber c, which has an orifice at c', designed to establish an exactly located measuring point. The line b runs thence to a pressure gauge or manometer d, which may be a mercury column manometer or a pressure gauge of any other character. The balance chamber is part of the pipe line and its orifice is the submerged orifice of the line. The term "pipe line", which I have used to designate the conduit b designates and includes pipes, tubing and conduits of any length, size, shape and character whatever, adapted to confine air between the measuring point and the gauge and to permit movement of air and pressure transmission by the air between these points. e represents a pipe leading from a source of air under pressure and connected to the pipe line b through a valve f. The pressure air source may be of any suitable character whatever, as an air compressor, a reservoir g of compressed air, or what not; provided only it is adapted to provide an adequate supply of air at adequate pressure for the purpose in view.

Except for the constant flow valve f, the apparatus thus shown is the same, in the principles of the manometer, pipe line, balance chamber, and compressed air source, as that shown in the before named Parks patent, to which attention is directed for explanation of details not described here. It differs from the Parks patent in the elimination of the manual valve therein shown, and the addition of the constant flow valve. For a disclosure in detail of the constant flow valve, attention is directed to Fig. 2. Said valve comprises a cylindrical casing or barrel having an inlet 10 at one end to which the air supply pipe e is connected, and outlets 11 and 12 in its sides to which the sections of the pipe line b leading respectively to the submerged end and to the gauge or indicator are connected. Between the inlet and outlets is a piston 13 fitting the valve casing and having a cup washer 14 or equivalent packing means to prevent leakage between its circumference and the walls of the casing. It has a central passage 15 running through it from end to end, the orifice of which remote from the inlet 10 is surrounded by a valve seat 16.

A needle valve member or spindle 17 is mounted centrally in a head 18 which is secured detachably to the open end of the valve body. The valve member terminates in a tapered end alined with the passage 15 and adapted to bear on the seat 16 when the piston is advanced toward the valve spindle. A spring 19 surrounding the valve spindle, bears on the piston and reacts on the head 18, tending to separate the piston from the valve. The mounting for the valve spindle comprises a stuffing box 20 screwed into the valve head 18 and in which the spindle is packed leakage tight and is screw threaded for adjustment endwise conformably to the pressures under which the apparatus is designed to operate. The gland nut 21 of the stuffing box is provided with an extension sleeve 22 to guard the valve spindle against mal-adjustment after it has been correctly adjusted.

It will be evident that the piston is pressed upon toward the valve by the air supply pressure, and away from the valve by the combined force of spring 19 and the pneumatic back pressure in the pipe line. The spring is a variable pressure means causing the valve to be more or less widely opened in proportion as the disparity between the supply pressure and the back pressure is less or greater. By making the spring with sufficient stiffness and length, the needle valve with sufficient taper, and adjusting the needle valve stem to the proper position, the valve may be wholly closed when the back pressure is at the minimum, fully opened when the back pressure is at the maximum of the range within which the apparatus is designed to operate, and partially opened to an extent proportional to the actual stage of back pressure between extremes.

But even when the liquid head is at its lowest ebb and the piston is in contact with the needle valve member, the air flow is not wholly shut off, because provision is made, as by a groove in the side of the valve, or a notch or nick in the valve seat, at one or more points, or by any other formation which prevents tight closing of the valve when the seat bears against it, for leakage at such times of enough air to permit a constant slow movement through the pipe line and escape from the balance chamber into the liquid. As the liquid head rises, the back pressure increases and opens the valve more widely in the amount needed to permit flow of more air and creation of enough pressure in the pipe line to maintain the exclusion of liquid from the submerged orifice. Always the air is throttled in passing the valve, so that at no time does it enter the pipe line so rapidly as to create an excess pressure, due to friction, sufficient to cause an appreciable error of indication by the gauge. This is true as well when the liquid head is at the highest point, for the back pressure then is nearly equal to the pressure of the air supply, the latter being intentionally limited to an amount only enough in excess of the back pressure to maintain a slow air flow through the pipe line against the maximum liquid head.

Various modifications in construction and arrangement of the various parts of the valve, and in the association of the valve with other parts of the apparatus, may be made without departing from the spirit of the invention and the scope of the appended claims. For example, instead of the piston here shown, other specifically different but equivalent movable means adapted to be displaced by variations in the fluid pressures pressing against it from opposite sides may be used. In the broad sense the piston is a movable partition within the casing dividing the latter into two chambers, one of which chambers receives the fluid of higher pressure, and the other receives the fluid of lower pressure, namely, that in the pipe line between the gauge and the submerged reference point.

What I claim and desire to secure by Letters Patent is:

1. A pneumatic depth indicator equipped for constant reading comprising the combination of a pressure gauge, a pipe line leading from said gauge and having an orifice adapted to be submerged in liquid, a source of air under pressure, and an inlet valve coupled to said pipe line and to said air source, said valve comprising cooperating valve and valve seat members, one of which is movable, and yieldable force-applying means arranged to exert force tending constantly to shift the said movable member into position for more widely opening the flow passage between the valve proper and the seat; said movable member being also exposed to the pressure of the air supply in the opposite direction to the force of said yielding means and to the back pressure of the pipe line in the same direction as the force application of said yielding means.

2. A pneumatic depth indicator organized for continuous indication of fluctuating heads comprising a pressure gauge, a pipe line leading from said gauge and having an orifice adapted to be submerged in liquid, a source of air under pressure, and a reducing valve connected to and between the pipe line and source of air and being regulated by the opposing pressures of the air source and the air in the pipe line to permit freer passage of air when the pipe line pressure is relatively high, and a less free passage of air when the pipe line pressure is relatively low.

3. A pneumatic depth measuring apparatus comprising a valve casing having an interior movable partition dividing its inner space into two chambers and having a through passage, a relatively stationary needle valve in one of said chambers alined with said passage and arranged to vary the effective outlet thereof with different positions of the partition but without ever wholly closing the passage, a source of pneumatic pressure connected with the other chamber of the casing, whereby pressure from said source tends to move the partition in the direction for restricting said passage, resilient means acting on the partition and tending constantly to move it so as to enlarge the effective area of the outlet, a pressure indicator, and a pipe line, both in connection with the chamber in which the needle valve is contained.

4. A pneumatic depth indicator for continuous reading of varying depths in liquids, and related values, comprising a pressure indicator, a pipe line leading from said indicator to the point below the surface of the body of liquid at which the depth is to be measured and having an orifice at such point, a source of air under pressure greater than the pressure head at such submerged point, a continuously open communication between said source on the one hand and said pipe line and indicator on the other hand, and means controlled by the back pressure in the pipe line for increasing and diminishing the flow capacity of such communication as such back pressure increases and diminishes respectively.

WILLIAM THOMAS.